(12) United States Patent
Tanaka et al.

(10) Patent No.: US 8,348,289 B2
(45) Date of Patent: Jan. 8, 2013

(54) RACK-AND-PINION MECHANISM AND STEERING SYSTEM

(75) Inventors: Takahiro Tanaka, Toyota (JP); Masahiko Hirose, Osaka (JP); Yoshiaki Izumi, Okazaki (JP)

(73) Assignee: JTEKT Corporation, Osaka (JP)

( * ) Notice: Subject to any disclaimer, the term of this patent is extended or adjusted under 35 U.S.C. 154(b) by 122 days.

(21) Appl. No.: 13/008,451

(22) Filed: Jan. 18, 2011

(65) Prior Publication Data

US 2011/0175311 A1    Jul. 21, 2011

(30) Foreign Application Priority Data

Jan. 21, 2010    (JP) .................................. 2010-011070

(51) Int. Cl.
*B62D 3/12* (2006.01)
(52) U.S. Cl. ................................................ 280/93.514
(58) Field of Classification Search ............ 280/93.514, 280/93.515; 74/422, 498
See application file for complete search history.

(56) References Cited

U.S. PATENT DOCUMENTS

| | | | | |
|---|---|---|---|---|
| 4,785,685 | A * | 11/1988 | Kobayashi et al. ............ | 74/498 |
| 6,539,821 | B2 * | 4/2003 | Bugosh ............................ | 74/422 |
| 7,926,376 | B2 * | 4/2011 | Hirose et al. .................... | 74/409 |
| 8,079,280 | B2 * | 12/2011 | Kubota et al. ................... | 74/422 |
| 2003/0052297 | A1 | 3/2003 | Enzaki et al. | |
| 2011/0067946 | A1 * | 3/2011 | Kim ............................ | 180/444 |

FOREIGN PATENT DOCUMENTS

| | | |
|---|---|---|
| EP | 1 882 622 A1 | 1/2008 |
| GB | 2 397 861 A | 8/2004 |
| JP | A-2005-41251 | 2/2005 |

OTHER PUBLICATIONS

Jul. 21, 2011 Search Report issued in European Application No. 11151388.3.

* cited by examiner

*Primary Examiner* — Faye M. Fleming
(74) *Attorney, Agent, or Firm* — Oliff & Berridge, PLC

(57) ABSTRACT

With a rack-and-pinion mechanism, an impact force is absorbed and reduction in assembling performance is suppressed. An annular fitting groove (51) that extends in the circumferential direction of a rack guide (41) is formed in an outer peripheral face (41a) of the rack guide (41), and an O-ring (52) is fitted in the fitting groove (51) in a state in which the axial movement of the O-ring (52) is restricted. A communication groove (61) that provides communication between an internal space (55), defined by the fitting groove (51) and the O-ring (52), and the outside of the rack guide (41) is formed in the rack guide (41).

6 Claims, 4 Drawing Sheets

US 8,348,289 B2

RACK-AND-PINION MECHANISM AND STEERING SYSTEM

INCORPORATION BY REFERENCE

The disclosure of Japanese Patent Application No. 2010-011070 filed on Jan. 21, 2010 including the specification, drawings and abstract is incorporated herein by reference in its entirety.

BACKGROUND OF THE INVENTION

1. Field of the Invention

The invention relates to a rack-and-pinion mechanism and a steering system that includes the rack-and-pinion mechanism.

2. Description of the Related Art

There is an existing rack-and-pinion mechanism that converts the rotation of a pinion shaft to a reciprocating motion of a rack shaft by engaging the pinion shaft with the rack shaft. The rack-and-pinion mechanism is used in, for example, a steering system for a vehicle. The rack-and-pinion mechanism changes the steering angle of steered wheels by converting the rotation of the pinion shaft caused by a steering operation into a reciprocating motion of the rack shaft.

In this type of rack-and-pinion mechanism, the rack shaft is supported so as to be able to reciprocate in the axial direction of the rack shaft in a state in which the rack shaft is pressed to the pinion shaft by a rack guide. The rack guide is provided in a housing portion of a housing so as to be movable in a direction in which the rack guide moves toward or away from the rack shaft. The rack guide presses the rack shaft to the pinion shaft in a state in which the rack guide is pressed by an urging member provided between the rack guide and a lid member fixed to an outer opening end of the housing portion.

A clearance is formed between the rack guide and the housing portion so that the rack guide is movably housed in the housing portion. Therefore, there is a possibility that the rack guide hits the housing portion due to, for example, the movement of the rack shaft caused by a steering operation or the vibration caused when a vehicle travels. As a result, abnormal noise may be generated. Therefore, an annular fitting groove that extends in the circumferential direction of the rack guide is formed in an outer peripheral face of the rack guide, and an elastic member, for example, an O-ring is fitted in the fitting groove. In this way, an impact force generated when the rack guide hits the housing portion is reduced to suppress generation of abnormal noise (refer to, for example, Japanese Patent Application Publication No. 2005-41251). Both axial end faces of the above-described O-ring contact side faces of the fitting groove. Thus, the O-ring is fitted in the fitting groove in a state in which the axial movement of the O-ring is restricted. With this structure, it is possible to avoid the situation where the O-ring is displaced from an appropriate position when the rack guide hits the housing portion. As a result, the impact force is reliably reduced.

In order to efficiently absorb an impact force generated when the rack guide hits the housing portion with the use of the O-ring, it is preferable to increase a bulk ratio $\alpha$ (=S2/S1) that is a ratio of a sectional area S2 of the elastic member to a sectional area S1 of the fitting groove. However, as shown in FIG. 6, axial end faces of an O-ring 81 contact side faces 83a and 83b of a fitting groove 82, respectively. Therefore, if the bulk ratio $\alpha$ is increased, air is likely to be accumulated in an internal space 84, defined by the O-ring 81 and the fitting groove 82, and the pressure in the internal space 84 may be increased when the O-ring 81 is fitted in the fitting groove 82. The pressure of the air makes it difficult to fit the O-ring 81 in the fitting groove 82 in a state in which the O-ring 81 contacts a bottom face 85 of the fitting groove 82. Therefore, part of the O-ring 81 may be pushed out of a rack guide 86.

A predetermined interference is set for the O-ring so that an outer peripheral face of the O-ring is brought into close contact with an inner face of the housing portion. Therefore, the O-ring is originally fitted in the fitting groove such that the outer peripheral portion thereof projects from the fitting groove. Accordingly, if part of the O-ring is pushed out of the rack guide by the pressure of the air as described above, the O-ring is more likely to get snagged when the rack guide is housed in the housing portion, which may reduce the assembling performance. In this regard, there is still room for improvement.

SUMMARY OF INVENTION

It is an object of the invention to provide a rack-and-pinion mechanism and a steering system, with which an impact force generated when a rack guide hits a housing portion is absorbed and reduction in assembling performance is suppressed.

An aspect of the invention relates to a rack-and-pinion mechanism including: a pinion shaft that has pinion teeth; a rack shaft that has rack teeth that mesh with the pinion teeth; and a tubular rack guide that supports the rack shaft such that the rack shaft is able to reciprocate in an axial direction of the rack shaft in a state in which the rack guide presses the rack shaft to the pinion shaft such that the rack teeth mesh with the pinion teeth. The rack guide is provided in a housing portion of a housing so as to be movable in a direction in which the rack guide moves toward or away from the rack shaft. The rack shaft is pressed to the pinion shaft by being pressed by an urging member provided in the housing portion. A fitting groove is formed in an outer peripheral face of the rack guide, and the fitting groove is formed as an annular groove that extends in a circumferential direction of the rack guide. An annular elastic member is fitted in the fitting groove, and the elastic member is fitted in the fitting groove in a state in which a movement of the elastic member in an axial direction of the elastic member is restricted. A communication portion is formed in the rack guide, and the communication portion provides communication between an internal space, defined by the fitting groove and the elastic member, and an outside of the rack guide.

With the structure described above, the air in the internal space defined by the fitting groove and the elastic member is discharged to the outside of the rack guide through the communication portion.

The rack-and-pinion mechanism according to the aspect described above may be mounted in a steering system.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
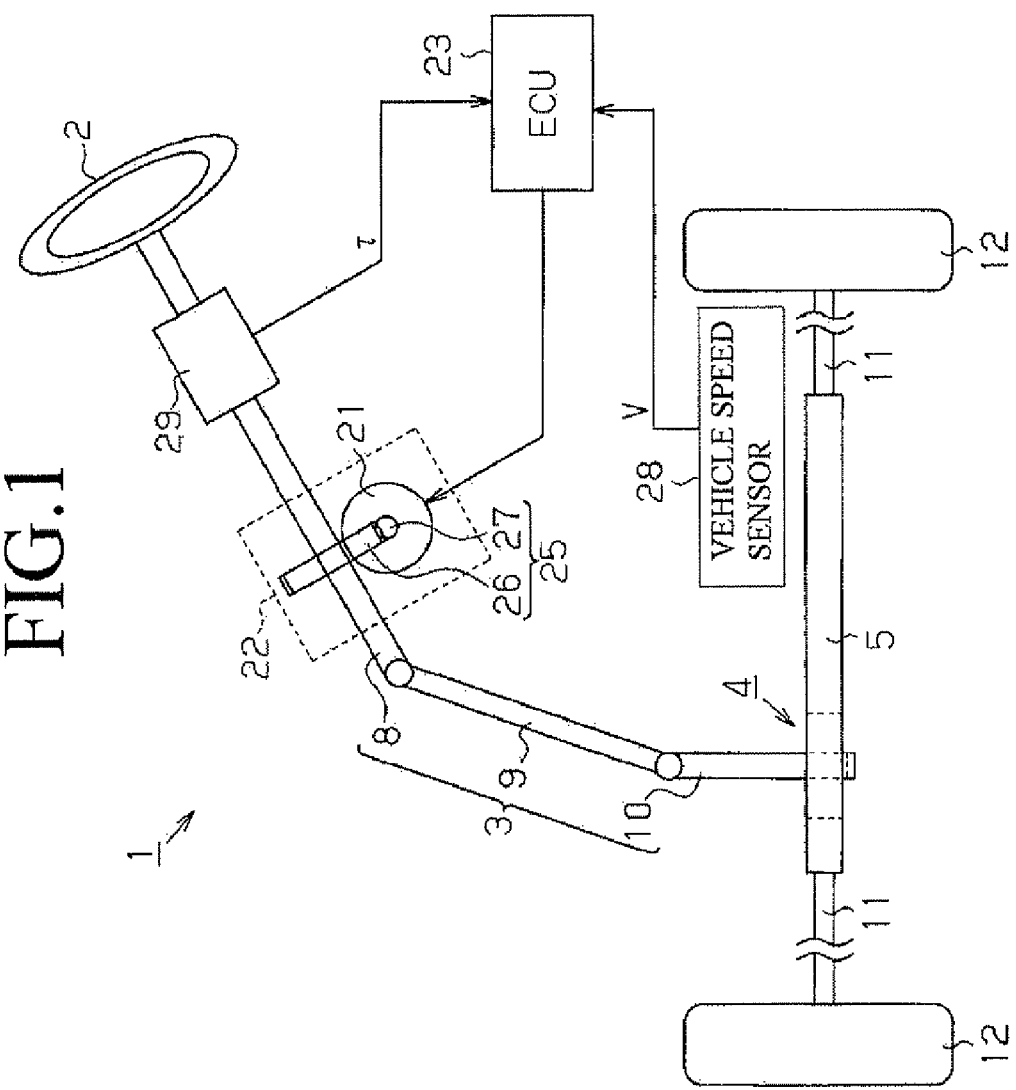
FIG. 1 is a view schematically showing the structure of an electric power steering system (EPS)

Hereafter, an embodiment of the invention will be described with reference to the accompanying drawings. As shown in FIG. 1, in an electric power steering system (EPS) 1, a steering shaft 3 to which a steering wheel 2 is fixed is connected to a rack shaft 5 via a rack-and-pinion mechanism 4. The rotation of the steering shaft 3 caused by a steering operation is converted into a linear reciprocating motion of the rack shaft 5 by the rack-and-pinion mechanism 4. The steering shaft 3 is formed by connecting a column shaft 8, an intermediate shaft 9 and a pinion shaft 10 to each other. The linear reciprocating motion of the rack shaft 5 caused in accordance with the rotation of the steering shaft 3 is transmitted to knuckles (not shown) via tie-rods 11 connected to respective ends of the rack shaft 5. Thus, the steering angle of steered wheels 12, that is, the traveling direction of a vehicle is changed.

The EPS 1 includes an EPS actuator 22 and an ECU 23. The EPS actuator 22 supplies an assist force for assisting a steering operation to a steering system, using a motor 21 as a drive source. The ECU 23 controls an operation of the EPS actuator 22.

The EPS actuator 22 is constituted as a column assist-type EPS actuator. The motor 21 that is a drive source for the EPS actuator 22 is drivably connected to the column shaft 8 via a speed reduction mechanism 25. The speed reduction mechanism 25 is formed by causing a wheel gear 26 connected to the column shaft 8 to mesh with a worm gear 27 connected to the motor 21. The speed of rotation of the motor 21 is reduced by the speed reduction mechanism 25, and the rotation having a reduced speed is transmitted to the column shaft 8. In this way, the motor torque is supplied to the steering system as an assist force.

A vehicle speed sensor 28 and a torque sensor 29 are connected to the ECU 23. The ECU 23 controls the operation of the EPS actuator 22, more specifically, the torque that is generated by the motor 21 which serves as the drive source, based on a vehicle speed V and a steering torquer detected by these sensors. Thus, the ECU 23 executes a control of the assist force that is supplied to the steering system.

Figure 2:
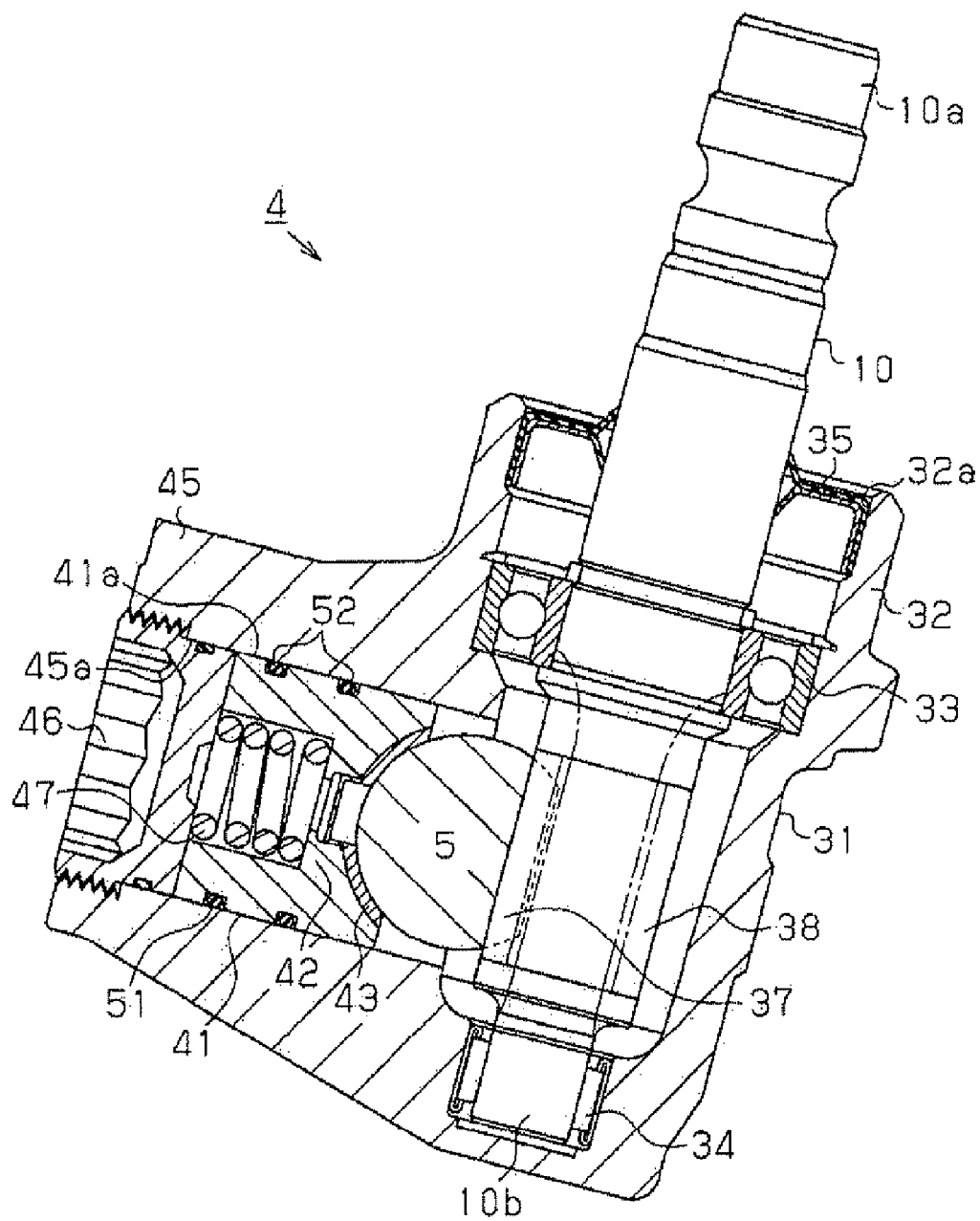
FIG. 2 is a sectional view schematically showing the structure of a rack-and-pinion mechanism.

The structure of the rack-and-pinion mechanism 4 in the embodiment will be described. As shown in FIG. 2, the rack-and-pinion mechanism 4 includes the rack shaft 5, the pinion shaft 10, and a rack housing 31 that serves as a housing in which the rack shaft 5 is housed. The rack housing 31 has a tubular portion 32 that extends in the direction (up-down direction in FIG. 2) substantially perpendicular to the rack shaft 5. The pinion shaft 10 is supported by bearings 33 and 34. Thus, the pinion shaft 10 is rotatably supported in the tubular portion 32.

The pinion shaft 10 is housed in the tubular portion 32 in such a manner that an upper end 10a connected to the intermediate shaft 9 (see FIG. 1) projects from an opening end 32a of the tubular portion 32. A seal member 35 is provided at the opening end 32a of the tubular portion 32. The seal member 35 slidably contacts the pinion shaft 10 that projects from the opening end 32a to liquid-tightly seal the opening end 32a. A ball bearing is used as the bearing 33 that supports substantially the center portion of the pinion shaft 10 in the tubular portion 32. A needle bearing is used as the bearing 34 that supports a lower end 10b of the pinion shaft 10. Pinion teeth 38 that mesh with rack teeth 37 of the rack shaft 5 are formed in the pinion shaft 10 at a portion between a portion supported by the bearing 33 and a portion supported by the bearing 34.

The rack shaft 5 is supported by a rack guide 41 and a plain bearing (not shown) provided in the rack housing 31 such that the rack shaft 5 is able to reciprocate in the axial direction thereof, The rack shaft 5 is pressed toward the pinion shaft 10 by the rack guide 41. The rack shaft 5 is connected to the pinion shaft 10 when the rack teeth 37 are meshed with the pinion teeth 38 of the pinion shaft 10.

The rack guide 41 and the structure near the rack guide 41 will be described in detail. The rack guide 41 is formed in a substantially bottomed cylindrical shape. A seat member 43 that is used as a slidably-contact face when the rack shaft 5 is pressed toward the pinion shaft 10 is fixed to a bottom portion 42 of the rack guide 41. The rack guide 41 is made of an aluminum alloy. The seat member 43 is formed by applying resin coating to a copper alloy.

The rack housing 31 has a housing portion 45 that houses the rack guide 41. The housing portion 45 is formed at such a position that the housing portion 45 faces the pinion shaft 10 with the rack shaft 5 interposed therebetween. The housing portion 45 is formed in a shape of a cylinder of which the axis is substantially perpendicular to the rack shaft 5 and the pinion shaft 10 and of which an end portion opens toward the outside of the rack housing 31. The rack guide 41 is housed so as to be movable in the housing portion 45 in the axial direction of the housing portion 45, that is, in a direction in which the rack guide 41 moves toward or away from the rack shaft 5. In order to house the rack guide 41 so as to be movable in the housing portion 45, the outer diameter of the rack guide 41 is made slightly smaller than the inner diameter of the housing portion 45, and a small clearance is formed between the rack guide 41 and the housing portion 45.

A substantially disk-shaped cap 46 is screwed to an outer opening end 45a of the housing portion 45 so that the outer opening end 45a is closed. The rack guide 41 is urged by a coil spring 47 that serves as an urging member provided between the rack guide 41 and the cap 46. In this way, the rack guide 41 presses the rack shaft 5 toward the pinion shaft 10. The coil spring 47 is provided in the cylindrical rack guide 41. Thus, one end of the coil spring 47 is brought into contact with the bottom portion 42 of the rack guide 41, and the other end of the coil spring 47 is brought into contact with the inner face of the cap 46. The cap 46 is screwed to the outer opening end 45a of the housing portion 45, and the coil spring 47 is compressed between the rack guide 41 and the cap 46. Thus, an urging force of the coil spring 47, that is, a pressing force with which the rack guide 41 presses the rack shaft 5 is defined.

Figure 3:
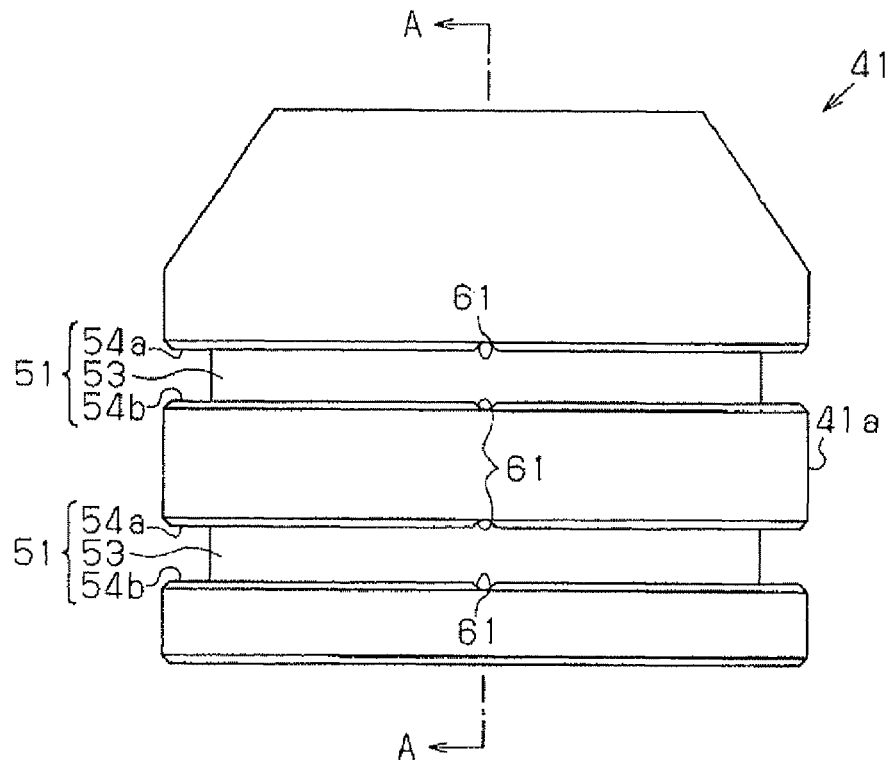
FIG. 3 is a side view showing a rack guide.
Figure 4:
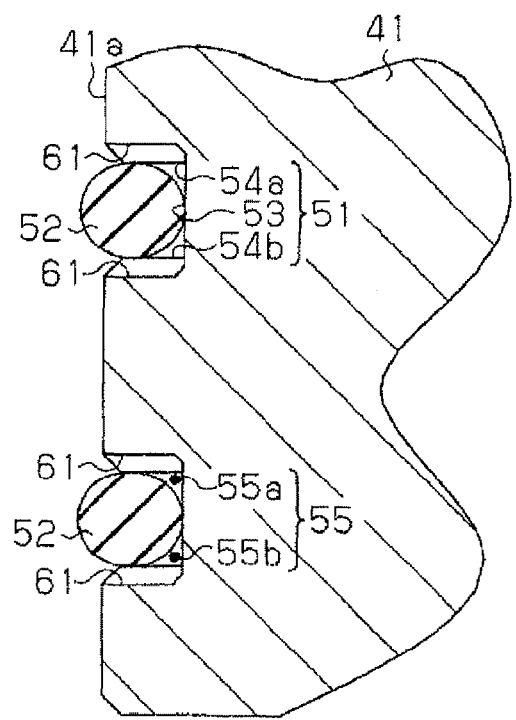
FIG. 4 is a sectional view taken along the line A-A in FIG. 3.

As shown in FIGS. 2 to 4, annular fitting grooves 51 that extend in the circumferential direction of the rack guide 41 are formed in an outer peripheral face 41a of the rack guide 41, and annular O-rings 52 that serve as elastic members are fitted in the fitting grooves 51. Each fitting grooves 51 is formed of a bottom face 53 and side faces 54a and 54b, and has a substantially U-shaped cross section. A radial inner end face of the O-ring 52 contacts the bottom face 53. The side faces 54a and 54b extend radially outward from respective axial end portions of the bottom face 53, the axial end portions being end portions in the axial direction of the rack guide 41. Then, axial end faces of the O-ring 52 contact the side faces 54a and 54b, respectively. Multiple (two in the embodiment) fitting grooves 51 are formed in the rack guide 41 at predetermined intervals in the direction in which the rack guide 41 moves, and the O-rings 52 are fitted in the respective fitting grooves 51.

These O-rings 52 are fitted in the respective fitting grooves 51 in a state in which the axial movement of the O-rings 52 is restricted. More specifically, the width of each fitting groove 51 (length of the fitting groove 51 in the direction in which the rack guide 41 moves) is made equal to or smaller than the diameter of the O-ring 52. The axial end faces of each O-ring 52 contact the side faces 54a and 54b, respectively, whereby the axial movement of each O-ring 52 is restricted. The O-rings 52 make it possible to reduce an impact force generated when the rack guide 41 hits the housing portion 45 due to the movement of the rack shaft 5 caused by a steering operation and the vibration caused when the vehicle travels. In this way, it is possible to suppress generation of abnormal noise.

Figure 6:
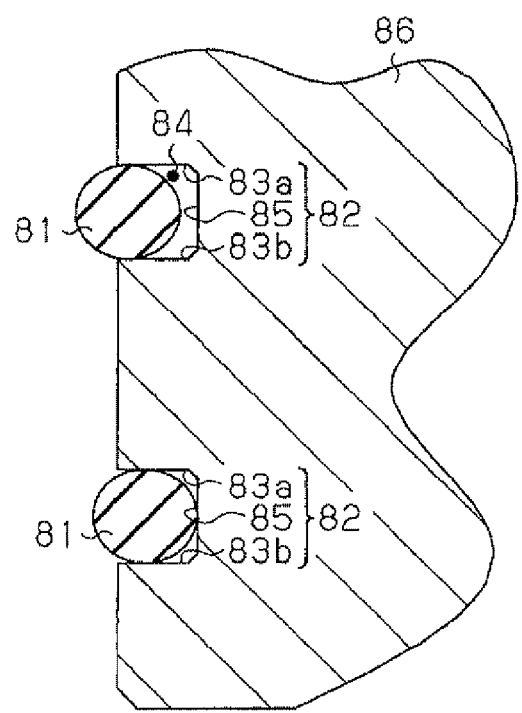
FIG. 6 is partially enlarged sectional view showing an existing rack guide.

In order to efficiently absorb the impact force of the rack guide 41 using the O-rings 52, it is preferable to increase a bulk ratio α (=S2/S1) that is a ratio of a sectional area S2 of the O-ring 52 to a sectional area S1 of the fitting groove 51. However, if the bulk ratio α is increased as described above, the pressure of the air in an internal space defined by the O-ring 52 and the fitting groove 51 is likely to increase, and part of the O-ring 52 is pushed out of the rack guide 41. This causes a problem that the O-ring 52 is more likely to get snagged when the rack guide 41 is housed in the housing portion 45 (see FIG. 6). The sectional areas S1 and S2 are the areas of the sections that are parallel to the axial direction and the radial direction of the rack guide 41 (O-ring 52).

In order to address the above-described problem, as shown in FIGS. 3 and 4, communication grooves 61 are formed in the rack guide 41. Each of the communication grooves 61 serves as a communication portion that provides communication between an internal space 55, defined by the fitting groove 51 and the O-ring 52, and the outside of the rack guide 41. When the O-ring 52 contacts the bottom face 53 of the fitting groove 51, the internal space 55 is divided into a first space 55a defined by the O-ring 52, the bottom face 53 and the side face 54a, and a second space 55b defined by the O-ring 52, the bottom face 53 and the side face 54b.

The communication groove 61 is formed in each of the side faces 54a and 54b of the fitting groove 51, which are formed on respective sides of the O-ring 52 in the axial direction of the O-ring 52. Multiple (two in the embodiment) communication grooves 61 are formed in each of the side faces 54a and 54b at predetermined intervals in the circumferential direction of the rack guide 41. The communication grooves 61 are formed as linear grooves that extend parallel to one direction (hereinafter, referred to as "lateral direction") perpendicular to the axial direction of the rack guide 41. Each communication groove 61 is formed in such a manner that one end thereof opens at the outer peripheral face 41a of the rack guide 41 and the other end thereof is flush with the bottom face 53 of the fitting groove 51. As shown in FIG. 3, each communication groove 61 is formed in a substantially triangular shape having a rounded corner when viewed in the radial direction of the rack guide 41.

Figure 5:
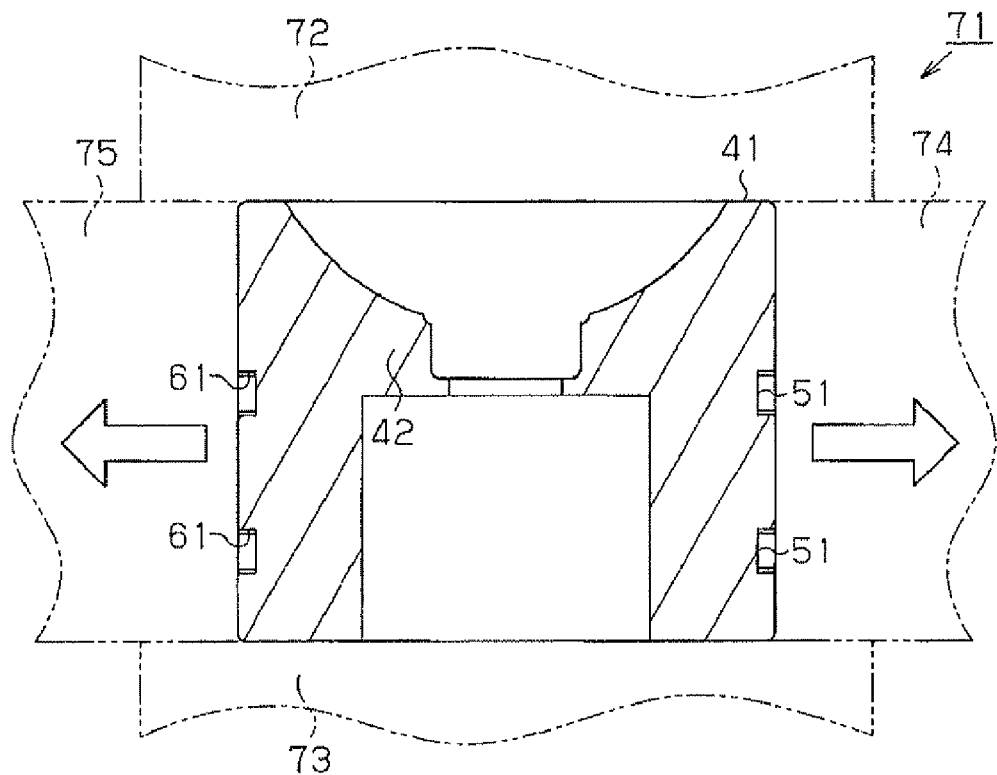
FIG. 5 is a view schematically showing a method of producing the rack guide.

A method of producing the rack guide 41 will be described. The rack guide 41 according to the embodiment is produced by casting with the use of multiple split dies. As shown in FIG. 5, a casting die 71 includes an upper die 72 and a lower die 73 that are arranged on the respective sides of the rack guide 41 in the axial direction, and a right die 74 and a left die 75 that are arranged on the respective sides of the rack guide 41 in the lateral direction. The casting die 71 is formed in such a manner that a casting space corresponding to the shape of the rack guide 41 is formed by the dies 72 to 75. Each of the right die 74 and the left die 75 has projections corresponding to the fitting grooves 51 and the communication grooves 61. During casting of the rack guide 41, the communication grooves 61 are formed. The right die 74 and the left die 75 are used as dies for forming grooves.

Molten metal is supplied to the casting space to form the rack guide 41. Then, the right die 74 and the left die 75 are removed along the lateral direction indicated by open arrows shown in FIG. 5, that is, along the direction in which the communication grooves 61 extend. Then, the upper die 72 and the lower die 73 are removed along the axial direction of the rack guide 41. In this way, the rack guide 41 is produced. Accordingly, each communication groove 61 is formed as a linear groove that extends parallel to the direction in which the right die 74 and the left die 75 are removed, and that opens at the outer peripheral face 41a of the rack guide 41.

As described above, according to the embodiment, the following advantageous effects are produced.

1) The annular fitting grooves 51 that extend in the circumferential direction of the rack guide 41 are formed in the outer peripheral face 41a of the rack guide 41, and the O-rings 52 are fitted in the respective fitting grooves 51 in a state in which the axial movement of the O-rings 52 is restricted. The rack guide 41 has the communication grooves 61 that provide communication between the internal space 55, defined by the fitting groove 51 and the O-ring 52, and the outside of the rack guide 41.

With the structure described above, the air in the internal space 55 is discharged to the outside through the communication grooves 61. Therefore, even if the bulk ratio of the O-ring 52 to the fitting groove 51 is increased, it is possible to avoid the situation where the air is accumulated in the internal space 55 and the pressure in the internal space 55 is increased. T bus, it is possible to efficiently absorb an impact force generated when the rack guide 41 hits the housing portion 45 using the O-rings 52 by increasing the bulk ratio. In addition, it is possible to suppress reduction in the assembling performance by avoiding the situation where part of each O-ring 52 is pushed out of the rack guide 41 by the pressure of the air. Also, it is possible to provide the quiet electric power steering system 1 in which generation of abnormal noise due to contact of the rack guide 41 with the housing portion 45 is suppressed.

2) The communication grooves 61 that serve as the communication portions that provide communication between the internal space 55 and the outside of the rack guide 41 are formed in the side faces 54a and 54b of the fitting groove 51, which are formed on the respective sides of the O-ring 52 in the axial direction of the O-ring 52. With the above-described structure, the communication portions are formed more easily than when communication is provided between the internal space 55 and the outside of the rack guide 41 by forming through-holes in the rack guide 41, the through holes opening at the outer peripheral face 41a and the side faces 54a and 54b of the fitting groove 51.

3) The communication grooves 61 are formed in the side faces 54a and 54b of the fitting groove 51, which are formed on the respective sides of the O-ring 52 in the axial direction of the O-ring 52. When the O-ring 52 contacts the bottom face 53 of the fitting groove 51 as described above, the internal space 55 is divided into the first space 55a and the second space 55b. If the communication groove 61 is formed in only one of the side faces 54a and 54b of the fitting groove 51, the air may be accumulated in one of the first space 55a and the second space 55b, and an increase in the pressure in the internal space 55 is not suppressed sufficiently. However, with the structure described above, the communication groove 61 is formed in each of the side faces 54a and 54b.

Therefore, it is possible to avoid the situation where the air is accumulated in the internal space 55 (the first space 55a and the second space 55b) and the pressure increases. Therefore, it is possible to reliably avoid the situation where part of each O-ring 52 is pushed out of the rack guide 41 by the pressure of the air.

4) The rack guide 41 is produced by casting with the use of the multiple split dies. The communication grooves 61 are formed as linear grooves that extend parallel to the direction in which the right die 74 and the left die 75 for forming the fitting grooves 51 and the communication grooves 61 are removed, and that open at the outer peripheral face 41a of the rack guide 41. With the structure described above, the communication grooves 61 are formed during casting of the rack guide 41. Therefore, for example, cutting work is not required to form the communication grooves 61 in the rack guide 41. Accordingly, it is possible to simplify the process of producing the rack guide 41.

The embodiment described above may be modified as follows. In the embodiment described above, the multiple fitting grooves 51 are formed in the rack guide 41 at predetermined intervals in the direction in which the rack guide 41 moves. However, the invention is not limited to this configuration. For example, only one fitting groove 51 may be formed in the rack guide 41.

In the embodiment described above, the communication grooves 61 are formed as linear grooves that extend parallel to the direction in which the right die 74 and the left die 75 for forming the fitting grooves 51 and the communication grooves 61 are removed, and that open at the outer peripheral face 41a of the rack guide 41. However, the invention is not limited to this configuration. Each communication groove 61 may be, for example, a linear groove or a curved groove that crosses the direction in which the right die 74 and the left die 75 are removed, as long as each communication groove 61 is in such a shape that communication is provided between the internal space 55 and the outside of the rack guide 41. Each communication groove 61 need not open at the outer peripheral face 41a. In this case, the communication groove 61 is formed by, for example, cutting work.

Also, the communication portions that provide communication between the internal space 55 and the outside of the rack guide 41 need not be formed by the communication grooves 61 formed in the fitting grooves 51. For example, through-holes that open at the outer peripheral face 41a of the rack guide 41 and the side faces 54a and 54b of each fitting groove 51 may be formed in the rack guide 41, and the communication portions may be formed by the through-holes.

In the embodiment described above, the communication groove 61 is formed in each of the side faces 54a and 54b of the fitting groove 51. However, the invention is not limited to this configuration. The communication groove 61 may be formed in only one of the side faces 54a and 54b of the fitting groove 51.

In the embodiment described above, the multiple communication grooves 61 are formed in each of the side faces 54a and 54b at predetermined intervals in the circumferential direction of the rack guide 41. However, the invention is not limited to this configuration. Only one communication groove 61 may be formed in each of the side faces 54a and 54b of the fitting groove 51.

In the embodiment described above, each communication groove 61 is formed during casting of the rack guide 41. However, the invention is not limited to this configuration. Each communication groove 61 may be formed in a process other than a process for casting the rack guide 41, for example, by cutting work.

In the embodiment described above, the rack-and-pinion mechanism 4 is applied to the steering system that is formed as a column assist-type electric power steering system (EPS). However, the invention is not limited to this configuration. The rack-and-pinion mechanism 4 may be applied to an EPS other than a column assist-type EPS, for example, a rack assist-type EPS, a hydraulic power steering system or a steering system with no power assist.

In the embodiment described above, the rack-and-pinion mechanism 4 is applied to the EPS 1. Alternatively, the rack-and-pinion mechanism 4 may be adapted for other uses.

What is claimed is:

1. A rack-and-pinion mechanism, comprising:
a pinion shaft that has pinion teeth;
a rack shaft that has rack teeth that mesh with the pinion teeth; and
a tubular rack guide that supports the rack shaft such that the rack shaft is able to reciprocate in an axial direction of the rack shaft in a state in which the rack guide presses the rack shaft to the pinion shaft such that the rack teeth mesh with the pinion teeth,
wherein the rack guide is provided in a housing portion of a housing so as to be movable in a direction in which the rack guide moves toward or away from the rack shaft,
wherein the rack shaft is pressed to the pinion shaft by being pressed by an urging member provided in the housing portion,
wherein a fitting groove is formed in an outer peripheral face of the rack guide, and the fitting groove is formed as an annular groove that extends in a circumferential direction of the rack guide,
wherein an annular elastic member is fitted in the fitting groove, and the elastic member is fitted in the fitting groove in a state in which a movement of the elastic member in an axial direction of the elastic member is restricted, and
wherein a communication portion is formed in the rack guide, and the communication portion provides communication between an internal space, defined by the fitting groove and the elastic member, and an outside of the rack guide,
wherein one end of the communication portion opens at an outer peripheral face of the rack guide and an other end of the communication portion is flush with a bottom face of the fitting groove.

2. The rack-and-pinion mechanism according to claim 1, wherein the communication portion is a communication groove that is formed in a side face of the fitting groove, which is formed on a side of the elastic member in the axial direction of the elastic member.

3. The rack-and-pinion mechanism according to claim 2, wherein the communication groove is formed in each of side faces of the fitting groove, which are formed on respective sides of the elastic member in the axial direction of the elastic member.

4. The rack-and-pinion mechanism according to claim 2, wherein the rack guide is produced by casting with use of multiple split dies, and wherein the communication groove is a linear groove that extends parallel to a direction in which the dies for forming the fitting groove and the communication groove are removed.

5. A steering system that comprises the rack-and-pinion mechanism according to claim 1.

6. The rack-and-pinion mechanism according to claim 2, wherein the communication groove is formed in a substantially triangular shape having a rounded corner when viewed in a radial direction of the rack guide.

* * * * *